United States Patent [19]

Putt

[11] 4,002,861
[45] Jan. 11, 1977

[54] PROTECTOR MODULE TEST SET

[76] Inventor: Dan W. Putt, 206 Avalon Road, Sebring, Fla. 33870

[22] Filed: Oct. 6, 1975

[21] Appl. No.: 619,949

[52] U.S. Cl. .............................. 179/175; 324/158 R
[51] Int. Cl.² .......................................... H04M 3/22
[58] Field of Search ................. 179/175, 175.1 R; 324/53, 158 R

[56] References Cited

UNITED STATES PATENTS

| | | | |
|---|---|---|---|
| 2,620,379 | 12/1952 | Zimmerman | 324/53 |
| 3,441,853 | 4/1969 | Bodine | 324/158 R |
| 3,532,967 | 10/1970 | Milton et al. | 324/158 R |
| 3,579,100 | 5/1971 | Lauver | 324/53 |
| 3,704,411 | 11/1972 | Jamieson | 324/53 |
| 3,711,661 | 1/1973 | Garrett et al. | 179/175.1 R |
| 3,870,836 | 3/1975 | Kusama | 179/175 |

*Primary Examiner*—Douglas W. Olms
*Attorney, Agent, or Firm*—George B. Oujevolk

[57] ABSTRACT

Generally speaking, the present invention contemplates a module test set in a carry-about case having on the outer side of the case lamps indicating the tip and ring sides and an alarm lamp. The case outer side also has a five prong plug to receive a module for testing and a test switch. The test set is operated by a circuit including a power line plug, an on-off switch, a transformer, tip, alarm, and ring lamp circuits, a module prong receiving receptacle connected to the tip, alarm and ring lamps and a test switch connected to the lamp circuits.

2 Claims, 8 Drawing Figures

PROTECTOR MODULE TEST SET

BACKGROUND OF THE INVENTION

The present invention relates to telephone connector protector module test set and more particularly to a portable test set to test the modules at a work site.

BRIEF OUTLINE OF THE PROBLEM

A telephone connector is a multi-pair, e.g., 100 pair unit used for terminating outside plant cables in central offices or customer premise locations. For most connectors current (heat coils) and voltage (carbon arrestors or gas tube) protection is required.

The connector consists of a connector base designed for installation on a main distribution frame and connector modules which plug into the base. The connector provides features for testing, identification of incoming circuits, and disconnection of outside cable pairs in addition to current and voltage protection through the use of several types of connector modules. The 100 pair capacity connector is available with or without a cable stub.

Connector modules will usually have heat coil and carbon arrester portection, or will also include a main office alarm line.

The connector base is a one piece flame retardant plastic molded panel fastened to a rugged metal mounting bar. The mounting bar is the electrical ground for the connector base. The panel is equipped with a group of five-pin grip type terminals. Four of these terminals provide contact for tip and ring connections between incoming cable and switching equipment. The fifth terminal provides a ground connection which also serves as a polarization terminal.

Central office wire-wrap terminals, arranged for mechanically wire wrapped connections, are located on the front right hand side of the panel for termination of cross-connection jumpers from line terminal blocks. An integral fanning strip is molded into the right hand edge of the connector base. The large sized holes in the strip are aligned with each row of central office wire-wrap terminals to permit easy insertion and identification of wire pairs.

All connector modules except the ones with a main office alarm line are furnished with five contact pins, three long and two short pins, in a plastic housing. The plastic housing for the module is made from a self-extinguishing plastic insulating material. When inserted into the connector base, the contact pins provide the following contact for one cable pair:

a. Tip and ring to outside plant conductors (long pins).

b. Tip and ring to central office equipment (short pins).

c. Ground, which also serves as a polarization pin (long pin).

When the connector modules are fully inserted into the connector base, the outside plant and central office equipment are connected. The grounding pin is connected to provide continuity through the connector base mounting bar and inter-connector ground straps to the copper ground bar at the base of the main distribution frame.

When the connector module is pulled out to the detent position the central office equipment is disconnected from the outside plant cable pairs. In the detent position, protection is provided only for the outside plant cable pair.

The modules are costly and testing is time consuming.

At present, the following procedure is used to test protector modules and remove any carbon dust which may accumulate in the carbon block gap. This procedure is performed prior to splicing the cable stub into the entrance cable and with the protector module in the detent position.

Probes are used. The test probe is touched to each tip and ring test terminal located on the top and bottom test fields. A blunt probe is used when contacting the test field to avoid damaging the gold plated test field contacts. Single pair test cords are also used for this purpose. A dual contact probe permits clearing both tip and ring circuits simultaneously when the clip leads are tied together and connected to a lamp and battery circuit.

The foregoing procedure in reality does not test the module but tests only the terminals. It is exceedingly cumbersome, and, the tendency on the part of the repairman is to throw away the modules and insert new modules without testing. Since these modules cost in the neighborhood of $2.50 apiece and there are usually one hundred pair modules to a connector, the present practice is quite costly.

SUMMARY OF THE INVENTION

Generally speaking, the present invention contemplates a module test set in a carry-about case having on the outer side of the case lamps indicating the tip and ring sides and an alarm lamp. The case outer side also has a five prong plug to receive a module for testing and a test switch. The test set is operated by a circuit including a power line plug, an on-off switch, a transformer, tip, alarm, and ring lamp circuits, a module prong receiving receptacle connected to the tip, alarm and ring lamps and a test switch connected to the lamp circuit.

The invention as well as other objects and advantages thereof will be more readily apparent from the following detailed description when considered with the accompanying drawings in which:

DETAILED DESCRIPTION

Figure 1:
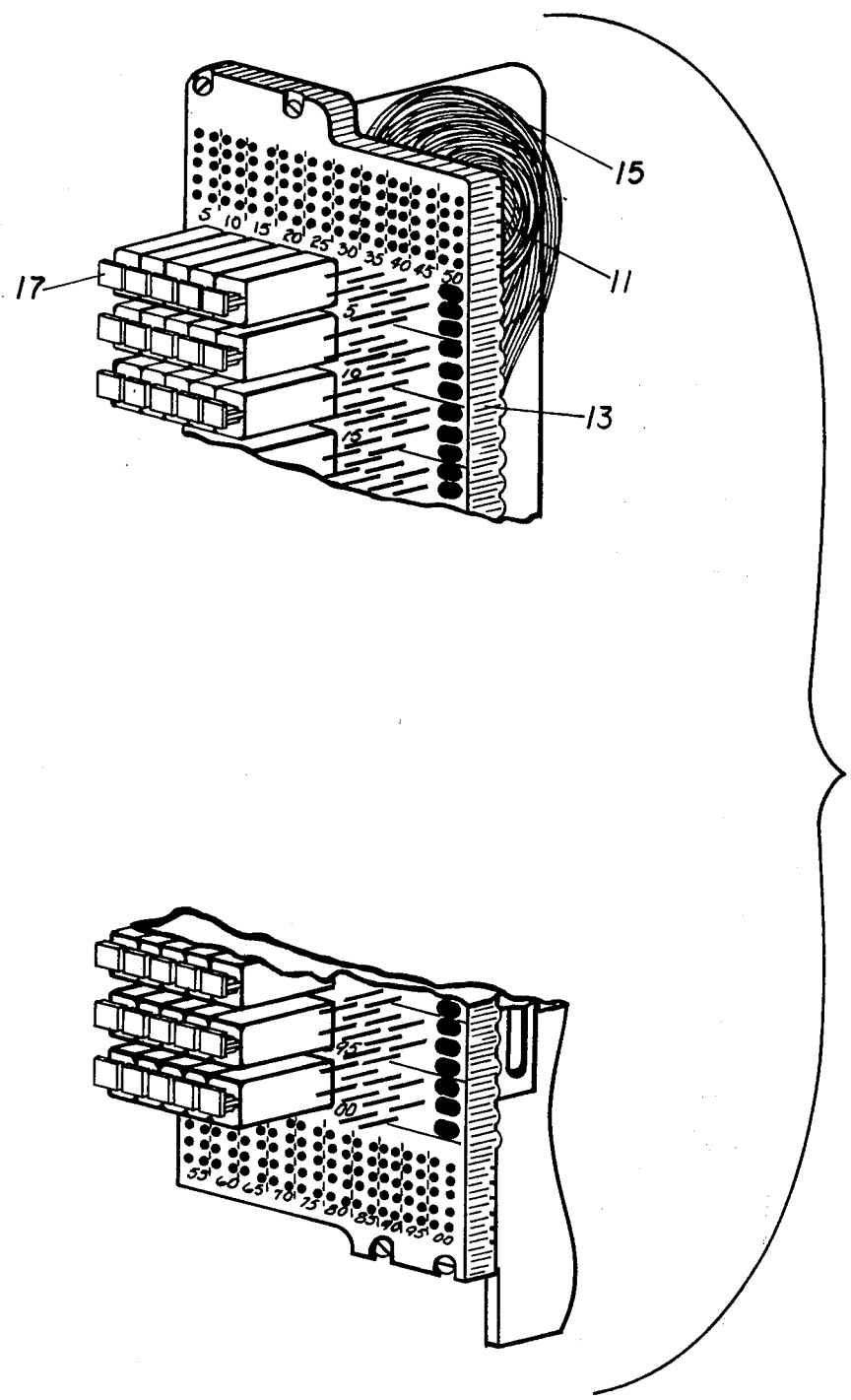
FIG. 1 shows a connector assembly having modules therein.
Figure 2:
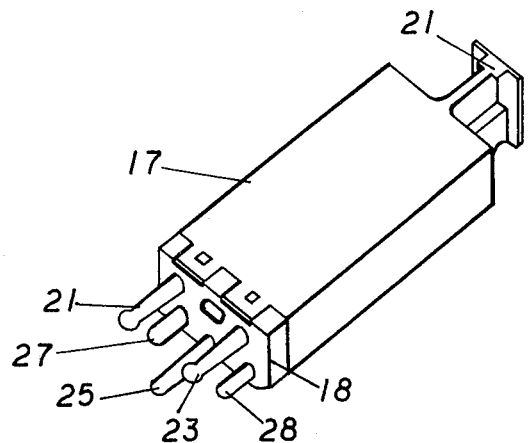
FIG. 2 is a perspective view of a module to be tested.

As has been heretofore stated, telephone cables terminate in a connector 11 (show in FIG. 1) having a connector base 13 for installation on a main distribution frame 15. The usual connector capacity is 100 pair each pair having one tip and one ring. For each pair there is a protector module 17 (shown in FIG. 2). Module 17 is an elongated rectangular unit having a base 18 with five prongs 28, 27, 25, 23, 21 at one end and a finger grip 21 at the other end. These five prongs 28, 27, 25, 23, 21 are respectively a tip prong 21, a ring prong 23, a ground prong 25 and two shorter prongs, tip prong 27 and ring prong 28.

Figure 3:
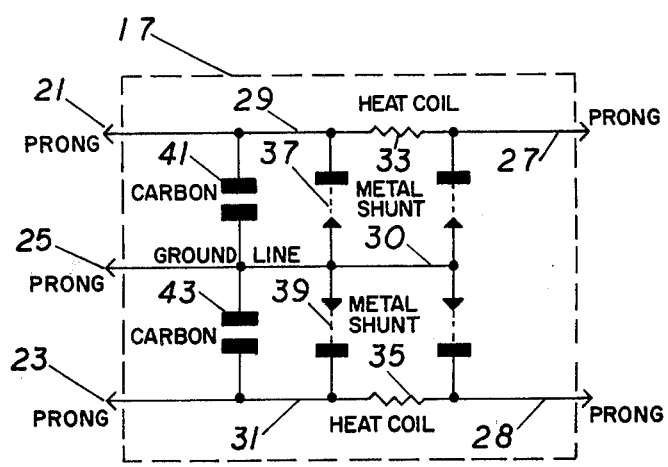
FIG. 3 shows a schematic circuit explanation of the module of FIG. 2.
Figure 4:
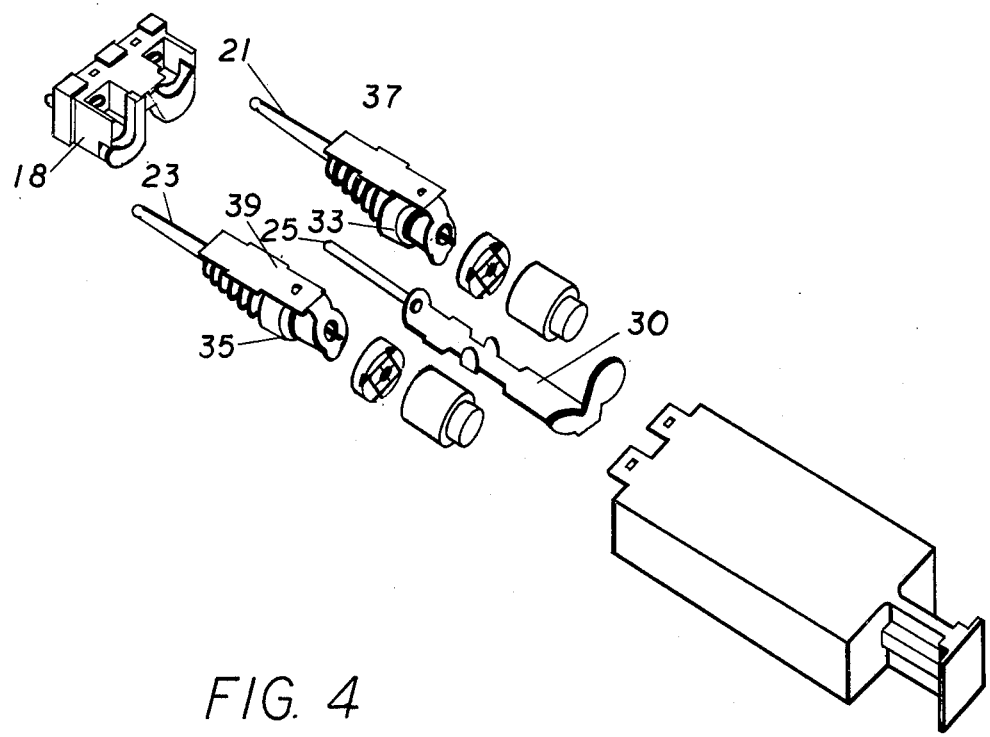
FIG. 4 presents an exploded view of a module.

As shown in the circuit of FIG. 3 and the exploded view of FIG. 4, the module 17 has two lines 29 and 31 connecting the long and short tip prongs 21, 27 and the long and short line prongs 23, 28, and a ground line 30 connected to ground pin 25. In other words, current on both the tip and ring sides flows through the module across lines 29 and 31. In both lines 29 and 31 are series heat coils 33, 35, metallic shunts 37, 39 between lines 29 and ground line 30, and between line 31 and ground line 30. These metallic shunts are operated by the heat coil. The heat coil operates in response to sneak currents and power crosses. Also in parallel with the metallic shunts are carbon blocks 41, 43. These carbon blocks are made of pressed carbon black powder, act as resistors and are very sensitive to dust.

Figure 5:
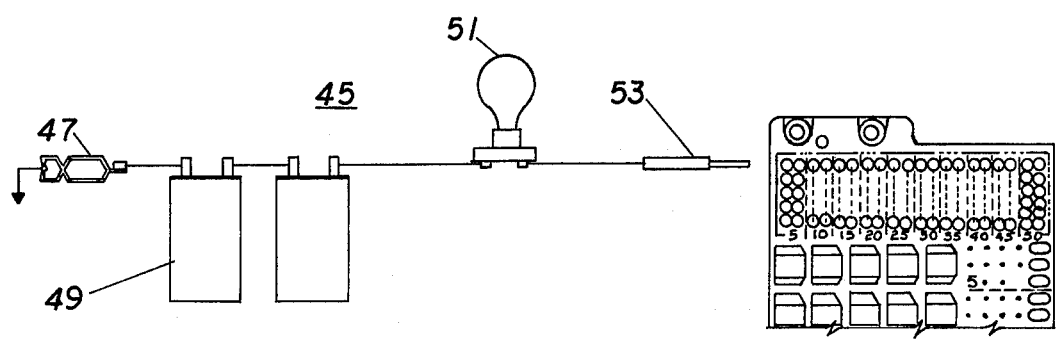
FIG. 5 shows a prior art test arrangement.

As shown in FIG. 5, and as heretofore explained, it is possible to conduct a limited test of a protector module and remove any carbon dust which may accumulate in the carbon block gap by testing the terminal. The protector must be placed in the detent position for this test. A test set 45 is assembled consisting of a ground clip batteries 49, a bulb and socket 51, and a probe 53. This probe is used to touch the tip and ring terminals. When the test probe is in contact with the test terminal and if there is any carbon dust, the light bulb will illuminate. The flow of current burns out the carbon dust and the lamp will extinguish. If the lamp remains illuminated the protector is thrown away and replaced with a new unit.

As is quite apparent, the foregoing procedure is defective and cumbersome and only tests for excess carbon dust. It does not test for other defects in the protector.

Figure 6:
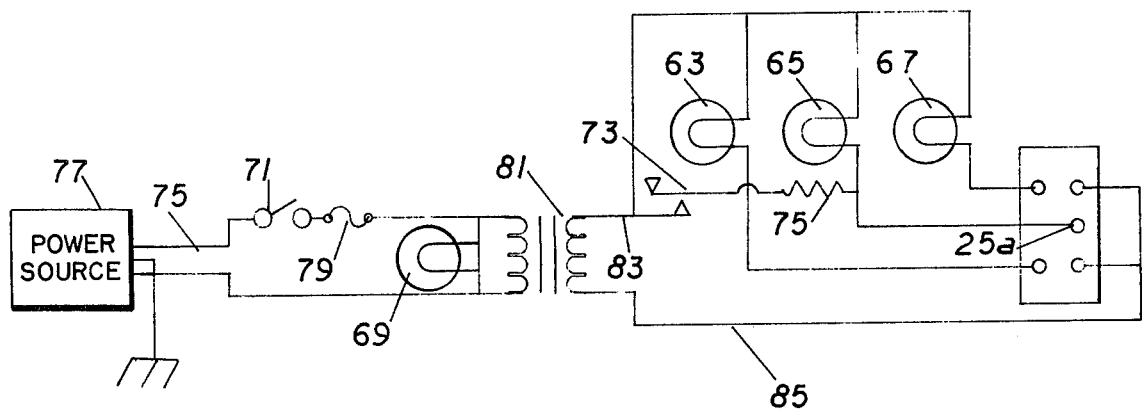
FIG. 6 shows a circuit diagram of the test set herein contemplated.
Figure 7A:
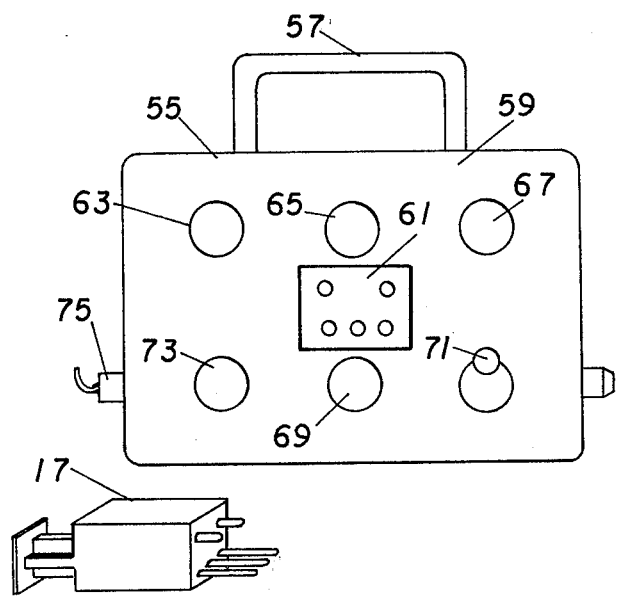
FIG. 7a is a front view of the test set carrying case.
Figure 7B:
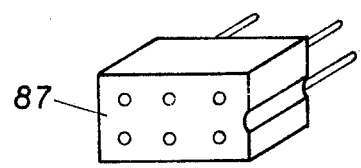
FIG. 7b illustrates in perspective an adaptor useful with the test set of FIG. 7.

The unit contemplated herein is shown in FIGS. 6, 7 and 7a. The unit is contained in a rectangular box-like housing 55, with a front panel 59 having a handle 57 with a five plug receptacle 61 to receive five prongs of the protector module located in the center of the front panel.

Over the five plug receptacle 61 are tip, alarm and ring sockets and lamps 63, 65, 67. Below the five plug receptacle 61 are a pilot lamp 69, a power switch 71 to the right and a test or clear switch 73 to the left. Connected to the housing is a power line 75. The power line 75 is desposed to plug into a power source 77. In series with the power line 75 is the power switch 71, a fuse 79 and pilot lamp 69. The power line 75 terminates in a transformer 81. Within the housing are circuits for the alarm, tip and ring lamps 65, 63, 67. Transformer 81 has a first and second side 85, 83 connecting the second side 83 and the long tip and ring prongs are the tip lamp 63, and the ring lamp 67, i.e., the tip and ring lamps are both in series with the transformer secondary second side and their respective plugs, and, in parallel with each other. Also connected in series between said second side and the ground prong is the alarm lamp 65. This alarm lamp 65 is likewise in parallel with the tip and ring lamps. Also connected to said second side 83 is the test or clear switch 73 in series with a 25 w.1-k ohm resistor 75. This resistor is connected in series with the alarm lamp and the ground plug.

Therefore, on closing the power switch 71, with a module inserted, lamp 72 lights up; the ring and tip circuits if in good order are closed and the ring and tip lamps are lit. If the alarm light is lit this means that either the shunt switch within the module is closed or that the carbon block has carbon dust. Pressing the clear switch will clear the carbon dust but will not open the shunt. Thus, if after pressing and releasing the clear switch the alarm light goes off carbon dust has been removed. If the light remains, the shunt circuit is closed and the heat coils have closed the shunt circuit. If either the tip or ring side lamps are out, there is an opening in the modules.

It may also be necessary to test a six prong module. This can be done by using a six-to-five prong adapter 87. The sixth prong is the second ground prong with is buried dead end in the adapter.

I claim:

1. A test set for a telephone connector protector (17) module used in a telephone connector (11) for cable terminations, said telephone connector (11) having a multiplicity of five prong protective modules (17) plugged therein, each of said modules having a tip and a ring circuit (29, 31) with a tip, ring, and ground, long prong (21, 23, 25), and a tip and ring short prong (27, 28), one heat coil (33, 35) and a shunt switch (37, 39) coupled to the tip and ring circuits and the ground prong, said test set comprising in combination;
    a. a rectangular box-like housing (55), with a front panel (59);
    b. a receptacle (61) in the center of said panel for receiving a five prong module having tip ring and ground long plugs (21, 23, 25) and tip and ring short plugs (27, 28);
    c. tip, alarm, and ring lamp sockets and lamps (63, 65, 67) in line in said panel above said receptacle (61), a clear switch (73), pilot lamp (69), power switch (71), in line in said panel below said receptacle;
    d. a power line (75) connected to said housing (55) with a plug in unit (77);
    e. a power line circuit connected to said plug-in unit including said power switch (71), a transformer primary and secondary (81), a pilot lamp (69) in parallel with said transformer primary and a fuse (79);
    f. first and second side lines (85, 83) connected to said secondary, said first side (85) terminating in tip and ring short plugs of said receptacle (61);
    g. a tip circuit connected between said second side (83) and said tip long plug having said tip lamp (63) in series therein;
    h. a ring circuit connected between said second side (83) and said ring long plug having said ring lamp (67) in series therein;
    i. an alarm circuit connected between said second side and said ground long plug having said alarm lamp (65) and a junction in series therein; and,
    j. a clear circuit connecting said second side and said junction having said clear switch (73) and a high value resistor therein,
    whereby, when a module to be tested is placed in said receptacle and the power switch is closed, the ring and tip lamps will light up if the module is in good order, the alarm light will not light up if there is no short, and if the clear switch is pressed the circuit closing should clear carbon dust in the modules, while if the tip or ring lamps fail to light or if the alarm lamp remains lit, the module is defective.

2. A test set as claimed in claim 1 including a six plug receptacle five prong insert adapter.

* * * * *